United States Patent
Kucera et al.

(10) Patent No.: US 11,128,559 B2
(45) Date of Patent: Sep. 21, 2021

(54) MULTIPLE PATH TRANSMISSION OF DATA

(71) Applicant: Alcatel Lucent, Nozay (FR)

(72) Inventors: Stepan Kucera, Dublin (IE); Kariem Fahmi, Dublin (IE)

(73) Assignee: Alcatel Lucent, Nozay (FR)

( * ) Notice: Subject to any disclaimer, the term of this patent is extended or adjusted under 35 U.S.C. 154(b) by 77 days.

(21) Appl. No.: 16/329,500

(22) PCT Filed: Sep. 14, 2017

(86) PCT No.: PCT/EP2017/073192
§ 371 (c)(1),
(2) Date: Feb. 28, 2019

(87) PCT Pub. No.: WO2018/050775
PCT Pub. Date: Mar. 22, 2018

(65) Prior Publication Data
US 2019/0199619 A1    Jun. 27, 2019

(30) Foreign Application Priority Data

Sep. 15, 2016   (EP) .................... 16306173

(51) Int. Cl.
| | |
|---|---|
| *H04L 12/707* | (2013.01) |
| *H04W 28/02* | (2009.01) |
| *H04N 21/61* | (2011.01) |
| *H04W 28/08* | (2009.01) |
| *H04N 21/63* | (2011.01) |
| *H04L 29/08* | (2006.01) |

(52) U.S. Cl.
CPC .............. *H04L 45/24* (2013.01); *H04L 67/28* (2013.01); *H04N 21/6125* (2013.01);
(Continued)

(58) Field of Classification Search
CPC ........ H04L 45/24; H04L 67/28; H04W 28/02; H04W 28/08; H04N 21/6125; H04N 21/6131; H04N 21/631
See application file for complete search history.

(56) References Cited

U.S. PATENT DOCUMENTS

| | | | |
|---|---|---|---|
| 2013/0064198 A1* | 3/2013 | Krishnaswamy | ....... H04L 45/24 370/329 |
| 2013/0077501 A1 | 3/2013 | Krishnaswamy et al. | |

(Continued)

FOREIGN PATENT DOCUMENTS

| | | |
|---|---|---|
| JP | 2009296084 A | 12/2009 |
| JP | 2014530564 A | 11/2014 |

(Continued)

OTHER PUBLICATIONS

X. Wei et al., "Internet-Draft 5.4.1 Mechanisms for on-path MPTCP proxy2 Mechanisms for off-path MPTCP proxy," pp. 1-11, XP055352501, Jul. 1, 2015.

(Continued)

*Primary Examiner* — Walli Z Butt
(74) *Attorney, Agent, or Firm* — Fay Sharpe LLP

(57) ABSTRACT

A user equipment, intermediate proxy node, method and computer program are disclosed. The user equipment comprises a network control domain and a user domain and is operable to receive and transmit data via multiple communication paths. The user equipment has conversion logic within the user domain operable to convert between a single data stream and multiple data streams formed from the single data stream, such that at least two of the multiple communication paths may be used for transmission of the multiple data streams formed from the single data stream.

20 Claims, 7 Drawing Sheets

(52) U.S. Cl.
CPC ....... *H04N 21/6131* (2013.01); *H04N 21/631* (2013.01); *H04W 28/02* (2013.01); *H04W 28/08* (2013.01)

(56) References Cited

U.S. PATENT DOCUMENTS

| | | | |
|---|---|---|---|
| 2014/0351447 A1* | 11/2014 | Annamalaisami | H04L 69/163 709/227 |
| 2015/0201046 A1* | 7/2015 | Biswas | H04L 69/321 370/329 |
| 2015/0215225 A1 | 7/2015 | Mildh et al. | |
| 2016/0205586 A1 | 7/2016 | Kim et al. | |
| 2017/0317920 A1* | 11/2017 | Rocquelay | H04L 45/74 |

FOREIGN PATENT DOCUMENTS

| | | |
|---|---|---|
| JP | 2016082438 A | 5/2016 |
| WO | WO 2012/099762 A1 | 7/2012 |

OTHER PUBLICATIONS

Kucera et al., "Low-Latency Communications in LTE Using Spatial Diversity and Encoding Redundancy," IEEE, 6 pages, 2016.

"Technology Vision 2020 Personalizing the Network Experience White Paper," Nokia Networks, pp. 1-20, 2015.

FutureWorks, "Technology Vision: Networks that delivery Gigabytes per user per day profitably and securely," Nokia Networks, pp. 1-23, 2015.

Marcus K. Weldon, "The Future X Network A Bell Labs Perspective," Bell Labs Alcatel-Lucent, 3 pages, 2016.

International Search Report for PCT/EP2017/073192 dated Dec. 14, 2017.

PCT Patent Application No. PCT/EP2017/073192, Written Opinion of the International Searching Authority, dated Dec. 14, 2017, 6 pages.

European Patent Application No. 16306173.2, Extended European Search Report, dated Feb. 6, 2018, 8 pages.

English Bibliography of Japanese Patent No. JP2009296084A, Published on Dec. 17, 2009, Printed from Derwent Innovation on Jun. 30, 2020, 6 pages.

English Bibliography of Japanese Patent No. JP2016082438A, Published on May 16, 2016, Printed from Derwent Innovation on Jun. 30, 2020, 5 pages.

English Bibliography of Japanese Patent No. JP 2014530564A, Published on Nov. 17, 2014, Printed from Derwent Innovation on Jun. 30, 2020, 7 pages.

Kimura et al., "Proposal of Reliable Protocol for Multipath", Proceedings of the IEICE General Conference, B-7-43, Feb. 24, 2015, 1 page (in Japanese).

* cited by examiner

MULTIPLE PATH TRANSMISSION OF DATA

FIELD OF THE INVENTION

The invention relates to the field of wireless data communication and in particular to the transmission of data via multiple paths.

BACKGROUND

There is an ever increasing demand for mobile data. A fifteen-fold increase in data traffic is expected in developed markets by 2020, while developing markets could potentially experience a 60-fold increase.

One way of meeting increased capacity demands without unduly increasing costs is to provide multi-path wireless communications, where different paths, in some cases using different radio access technologies (RAT), are used simultaneously to deliver a single data flow over these multiple parallel wireless links (paths).

Although different approaches to multi-path communications are being considered these generally relate to changes in the network side. FIGS. 1 and 2 show different approaches to these multi-path techniques on the network side, while FIG. 3 shows a user equipment according to the prior art where an application generates a stream of data within the user domain and this is output via the network control domain or kernel to an output socket for transmission using a single communication path. A drawback of the multi-path techniques shown in FIGS. 1 and 2 is that only compatible user equipment can currently use these techniques.

It would be desirable for a user equipment to be able to communicate using multiple wireless communication links or paths without requiring extensive modification of the user equipment, particularly not of the portion of the user equipment that is not generally accessible to the user and alteration of which might invalidate a warranty.

SUMMARY

A first aspect of the present invention provides a user equipment comprising a network control domain and a user domain, said user equipment being operable to receive and transmit data via multiple communication paths, said user equipment comprising: conversion logic within said user domain operable to convert between a single data stream and multiple data streams formed from said single data stream, such that at least two of said multiple communication paths may be used for transmission of said multiple data streams formed from said single data stream.

The inventors of the present invention recognised the advantages of multi-path communications along with the difficulties involved with modifying the network stack of a user equipment in order to allow it to deploy multi-path communications. In this regard although theoretically, modern mobile devices such as smart phones and tablets can support multi-technology multi-band networking as they are commonly equipped with multiple LTE, HSPA, WiFi transceivers operational in multiple licensed and unlicensed frequency bands, practically, however, any legacy user equipment (UE) requires modifications of the network stack in order to deploy multi-path communications. More specifically, UE unlocking and/or super-user access to its operating system is required. For example, network-layer solutions such as LWIP (LTE WLAN radio level integration with IPSec tunnel) and LWA (LTE WLAN aggregation) as shown in FIG. 1 require the modification of routing tables together with the management of IPSec tunnels, while the transport-layer solutions based on MPTCP (multi-path transmission control protocol) requires the replacement of the entire transport layer of the networking stack. Other multi-path protocols like SCTP (stream control transmission protocol) are even incompatible with the current application programming interface which would therefore require the adaptation of user applications by their authors.

Yet deploying multi-path communications based on kernel modifications is commercially an unviable option; UE unlocking often implies void UE warranty, while establishing super-user access has security and privacy implications. Network operators who would be willing to tackle such issues still would have to develop and maintain software patches and kernel builds for all existing phone versions and their proprietary drivers, resulting in significant costs.

These problems have been addressed by providing conversion logic within the user domain which is operable to convert between single and multiple data streams. In this way rather than providing this functionality within the network control domain or kernel of the user equipment that may require super user access and unlocking of the UE, it is provided in the user domain that is easily accessible. This allows it to be simply updated requiring only user access, and does not require any modification of the UE operating system. In this way both the network and the UE network control domain see and route multiple data streams in the way that they deal with other multiple data streams, the conversion between multiple and single data streams being done in the user domain.

In some embodiments, said single data stream comprises header information compliant with a first transport protocol; and said conversion logic is operable to add header information compliant with a further transport protocol to said multiple data streams, said added header information containing information for routing said multiple data streams to an intermediate proxy node.

The conversion logic will receive the single data stream which has header information that is compliant with a first transport protocol. This first transport protocol is one that the network control domain of the user equipment can decode as it will be transmitted to the conversion logic via the routing circuitry within the user equipment. Similarly, the multiple data streams will be amended to comprise header information that will be compliant with a further transport protocol that the network can decode as this will be used for routing the multiple data streams to their subsequent destination. These two transport protocols should be standardized transport protocols that the operating system of the user equipment and the network understand. They can in some cases be the same protocol. The header information of the multiple data streams contains routing information to route the multiple data streams via an intermediate proxy node, this node being present to generate the original single data stream from the multiple data stream before the final destination is reached. Thus, the conversion logic is operable to add header information to the multiple data streams according to a further transport protocol, that header information indicating routing via an intermediate proxy node.

In some embodiments, said multiple data streams further comprise header information according to a second protocol, said header information providing an indication of how data in said multiple data streams relate to data packets in said single data stream.

In some cases, as well as having the further transport protocol that is used for routing the multiple data stream, further header information compliant with a second protocol and indicative of how the multi-path data relates to the single path data may be added to the data packets of the multiple data streams. Providing additional header information using a different protocol allows this protocol to be defined within the conversion logic in the user domain providing the freedom to implement both (legacy) standardized and (optimized proprietary) non-standardized protocols for multi-path communications. In this regard this protocol is not used for routing the data streams and as such needs only to be understood by the user equipment conversion logic and the corresponding intermediate proxy node which will do a corresponding multi-path to single path conversion.

The headers compliant with the second protocol provide an indication of how the data in the multiple data streams relate to the data packets in the single data stream and thereby allow the multiple data streams to be recombined to reform the single data stream at a later point. In this regard, the information in the header may indicate the data packet order of the single data stream and/or it may indicate other things such as error codes.

In some embodiments, said conversion logic is operable to change between headers compliant with said first transport protocol; and headers compliant with said further transport protocol when converting between said single data stream and said multiple data streams.

When converting between the single data stream and the multiple data streams, the conversion logic is operable to change the header such that the first transport protocol headers that are linked to the single data stream are changed to headers compliant with the further transport protocol for the multiple data streams. Although in some cases the two protocols may be the same protocol the headers will not be as the multiple data streams will be routed via an intermediate proxy node.

Furthermore, where additional header information according to a second protocol is used, this is also provided by the conversion logic to the multiple data streams. In this way, the multiple data streams will have two headers, one of them being according to the further transport protocol which is used by the network for routing the data stream and the other providing information regarding the data packets in the multiple data stream and in particular how they relate to the original single data stream allowing downstream conversion logic to reassemble the original data stream. Where the conversion logic is converting from the multiple data streams to the single data streams, then the header data is changed from the further transport protocol to the first transport protocol where these protocols are different and where there is additional header data compliant with the second protocol, then this is used to reassemble the single data stream and in particular where the data packets have a particular order, it is used in the ordering of the data packets.

In some embodiments, said single data stream comprises header information according to said first transport protocol, and said conversion logic is operable to convert said output data stream to multiple output data streams by: removing said header information according to said first transport protocol; adding header information according to said second protocol to said multiple data streams; and adding further header information to said multiple data streams according to a further transport protocol, said multiple data streams being routed according to said header information of said further transport protocol via an intermediate proxy node.

In some embodiments, said user equipment further comprises a virtual interface within said network control domain, said virtual interface being configured to route data streams between a user application in said user domain and said conversion logic.

In some embodiments the user equipment comprises a virtual interface within the network control domain which is operable to route a data stream between a user application and the conversion logic. In some embodiments the virtual interface is part of a virtual private network provided by the user equipment and is used to divert a data stream between an application and the virtual private network. Thus, embodiments make use of this functionality provided by a user equipment, to divert a data stream routed within the network control domain back to the user domain and in this way allow data streams to be modified by applications within the user domain.

In some embodiments, said user equipment further comprises a virtual interface within said network control domain, said virtual interface being configured to divert said single data stream output from an application operating in said user domain to said conversion logic within said user domain; said conversion logic being operable to convert said single data stream to said multiple data streams and to output said multiple data streams towards multiple outputs within said network control domain of said user equipment.

As noted previously, allowing any modification of the network control domain or kernel of the user equipment requires access to this domain which in many cases may void the warranty of the user equipment. However, many user equipment have a virtual interface within the network control domain as part of a virtual private network which is there to divert a data stream that is routed to an output via this interface back to the user domain. This is generally used to route data to be output to an encryption algorithm within the user domain which encrypts the data and then forwards it for output. The inventors of the present invention recognized that this virtual interface could be used to divert a data stream generated by an application in the user domain to conversion logic within the user domain which could then be used to amend the data stream prior to its output. In this way, conversion logic could be provided in the user domain to convert a single data stream for output into multiple data streams. This allows the conversion process to be performed according to an application that may be downloaded by a user.

In some embodiments, said conversion logic is operable in response to receipt of said multiple data streams to generate said single data stream from said multiple data streams.

The conversion logic has previously been described as converting the uplink data from a single stream generated by an application to multiple streams for transmission. The conversion logic is also operable to receive and convert download data that is received as multiple streams into a single data stream which can then be transmitted via the virtual interface to the relevant application.

In some embodiments, said first transport protocol is a more complex transport protocol than said further transport protocol.

As the further transport protocol may often be used in conjunction with additional header information according to a second protocol, it can be a very simple transport protocol containing very little information in the header, the information simply indicating for example the socket that the data is to be output via. It may for example be protocol-less raw socket data or it may be a simple transport protocol such as UDP/IP (user datagram protocol). The first transport protocol does not have the benefit of additional header information and thus, is generally a more complex legacy transport protocol such as TCP (transmission control protocol).

In some embodiments, at least one of said multiple data streams comprises error correction codes for data within said single data stream.

The provision of multiple data streams allows for the data to be sent in parallel providing greater transport capacity or bandwidth. This increase in capacity can also be used to transmit error correction codes such as forward error correction codes which allow errors in the received data due to, for example, dropped packets to be detected and in some cases corrected.

In some embodiments, said conversion logic is operable to generate said error correction codes associated with said data of said single data stream and to transmit said error correction codes along at least one of said multiple data streams.

Although error correction codes may be present in the single data stream, in some embodiments they are generated by the conversion logic and sent in one or more of the multiple data streams. In this regard, one of the multiple data streams may be used to transmit the error correction codes; in alternative embodiments they may be transmitted with the data to which they relate in the multiple data streams. In any case, there will be some indication of which data packets they relate to.

A second aspect of the present invention provides a method performed at a user equipment, said user equipment comprising a network control domain and a user domain, said user equipment being operable to receive and transmit data via multiple communication paths having different properties, said method comprising: converting within said user domain between a single data stream and multiple data streams such that at least two of said multiple communication paths may be used for transmission of said single data stream.

In some embodiments, said single data stream comprises header information compliant with a first transport protocol; and said multiple data streams comprise header information compliant with a further transport protocol for routing said multiple data streams to an intermediate proxy node.

In some embodiments, said method further comprises removing said headers compliant with said first transport protocol and adding headers compliant with said further transport protocol when converting between said single data stream and multiple data streams.

In some embodiments, said method further comprises adding header information compliant with a second protocol to said multiple data streams, said header information providing an indication of how data in said multiple data streams relate to data packets in said single data stream.

In some embodiments, said method comprises generating error correction codes associated with said data of said single data stream and transmitting said error correction codes along said at least one of said multiple data streams.

A third aspect of the present invention provides an intermediate proxy node operable to receive and forward signals transmitted between a user equipment and a server, said intermediate proxy node comprising: multiple user equipment interfaces for communicating via multiple communication paths with a user equipment; and a server interface for communicating with a server via a single communication path; said intermediate proxy node comprising conversion logic operable to convert between multiple data streams and a single data stream, such that a single data stream sent via said communication path between said server and said intermediate proxy node is sent as multiple data streams via multiple data paths between said user equipment and said intermediate proxy node.

User equipment of the present invention functions in a network in conjunction with an intermediate proxy node which acts to convert between multiple and single data streams such that the entity with which the user equipment is communicating sees a single data stream, while the data is transmitted through much of the network as multiple data streams. This intermediate proxy node is located between the user equipment and the other entity and may be located as an entity on its own or within another entity such as within a network node, within the cloud or within a server. The intermediate proxy node acts to convert the single data stream output by for example, a server to a multiple data stream for transmission to the user equipment and to perform the converse operation of converting multiple data streams received from the user equipment to a single data stream for transmission to the server. The conversion logic within the intermediate node corresponds to the conversion logic within the user equipment and thus, the second protocol used by conversion logic in each, for the multi-path functionality can be selected and updated as required by simply updating the conversion logic in both of the user equipment and the intermediate proxy node.

In some embodiments, said intermediate proxy node comprises a network control domain and a user domain, and said conversion logic is within the network control domain.

As the intermediate proxy node is a bespoke item, amending the kernel or network control domain to provide additional or different functionality is not an issue and thus, in some cases it may be advantageous to provide the conversion logic or application within this domain as this may improve performance.

In some embodiments, said single data stream comprises header information compliant with a first transport protocol; and said multiple data streams comprise header information compliant with a further transport protocol, said conversion logic being operable to change headers in said data streams when converting between said single data stream and said multiple data streams.

In some embodiments, said conversion logic is operable to add header information compliant with a second protocol to said multiple data streams when converting said single data stream to said multiple data streams, said header information providing an indication of how data in said multiple data streams relates to data packets in the said single data stream.

In some embodiments, said first transport protocol is a more complex transport protocol than said further transport protocol.

In some embodiments, at least one of said multiple data streams comprises error correction codes for data within said single data stream.

In some embodiments, said conversion logic is operable to generate said error correction codes associated with said data of said single data stream and to transmit said error correction codes along said at least one of said multiple data streams.

Although error correction codes may be present in the single data stream, in some embodiments they are generated by the conversion logic and sent in one or more of the multiple data streams. In this regard, one of the multiple data streams may be used to transmit the error correction codes; in alternative embodiments they may be transmitted with the data to which they relate in the multiple data streams. In any case, there will be some indication of which data packets they relate to.

A third aspect of the present invention provides a method performed at an intermediate proxy node for receiving and forwarding signals transmitted between a user equipment and a server, said intermediate proxy node comprising: a user equipment interface for communicating via multiple communication paths of different types with a user equipment; and a server interface for communicating with a server via a single communication path; said method comprising converting between multiple data streams and a single data stream, such that a single data stream sent via said communication path between said server and said intermediate proxy node is sent as multiple data streams via multiple data paths between said user equipment and said intermediate proxy node.

In some embodiments, said method further comprises removing said headers compliant with said first transport protocol and adding headers compliant with said further transport protocol when converting between said single data stream and multiple data streams.

In some embodiments, said method further comprises adding header information compliant with a second protocol to said multiple data streams, said header information providing an indication of how data in said multiple data streams relate to data packets in said single data stream.

In some embodiments, said method comprises generating error correction codes associated with said data of said single data stream and transmitting said error correction codes along said at least one of said multiple data streams.

In some embodiments, at least one of said multiple data streams comprises error correction codes for data within said single data stream.

In some embodiments, said method further comprises generating said error correction codes associated with said data of said single data stream and to transmit said error correction codes along said at least one of said multiple data streams.

A fourth aspect of the present invention provides a computer program which when executed by a processor is operable to control said processor to perform a method according to a first or a third aspect of the present invention.

A fifth aspect of the present invention provides a system comprising at least one user equipment according to a first aspect of the present invention and an intermediate proxy node according to a third aspect of the present invention, said user equipment and intermediate proxy node communicating via multiple communication paths with each other.

Further particular and preferred aspects are set out in the accompanying independent and dependent claims. Features of the dependent claims may be combined with features of the independent claims as appropriate, and in combinations other than those explicitly set out in the claims.

Where an apparatus feature is described as being operable to provide a function, it will be appreciated that this includes an apparatus feature which provides that function or which is adapted or configured to provide that function.

BRIEF DESCRIPTION OF THE DRAWINGS

Embodiments of the present invention will now be described further, with reference to the accompanying drawings, in which.

DESCRIPTION OF THE EMBODIMENTS

Figure 1:
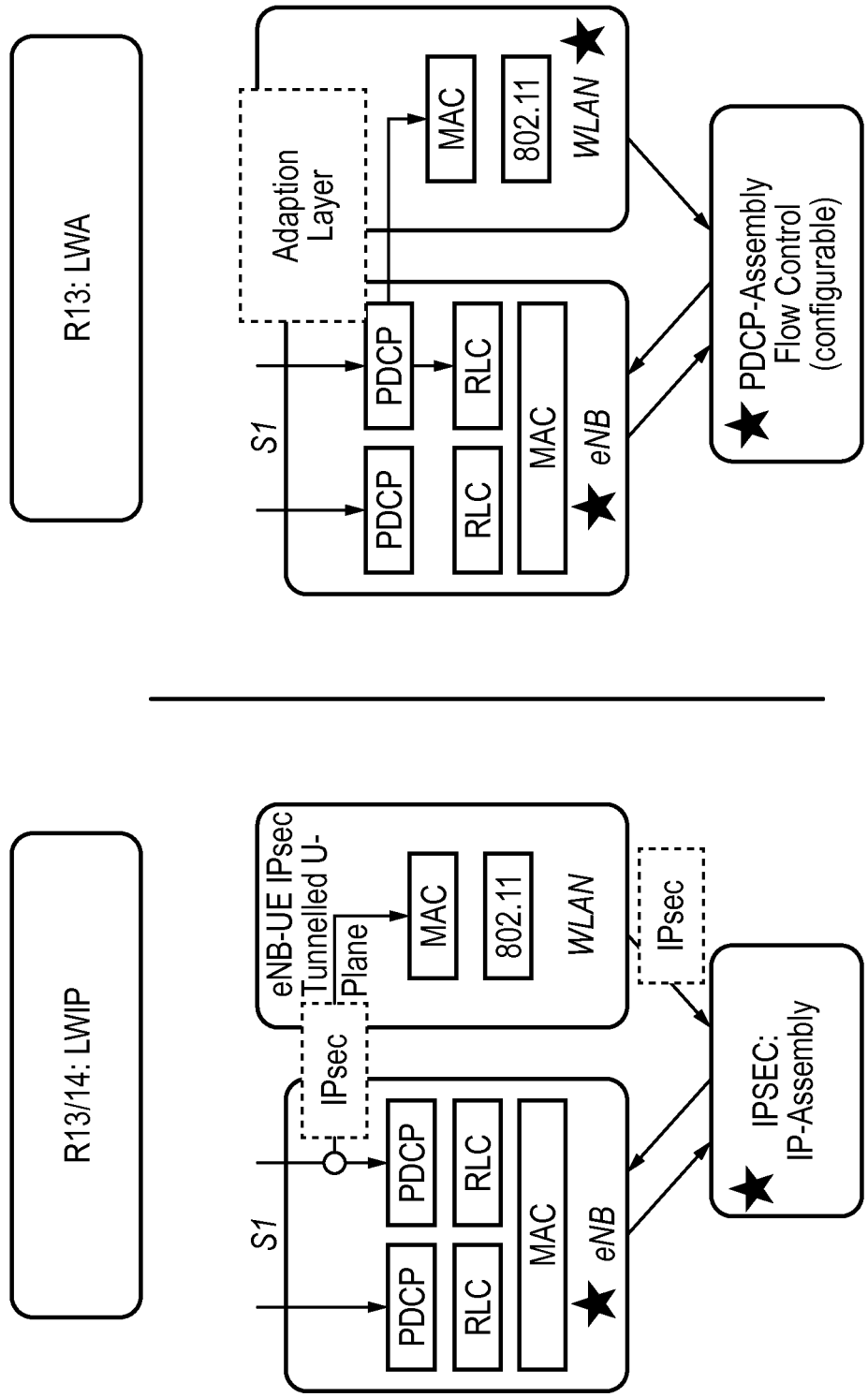
FIG. 1 schematically represents network layer LTE and WiFi integration for multi-path communication according to the prior art.
Figure 2:
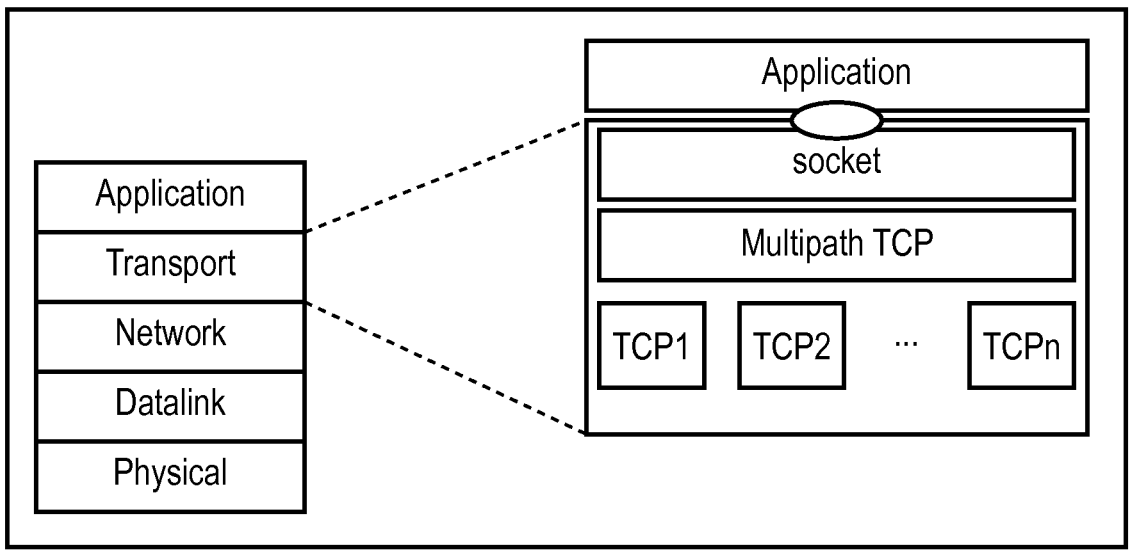
FIG. 2 shows a schematic visualisation of the open system interconnection protocol stack for multi-path transport control protocol as standardised by the IETF.
Figure 3:
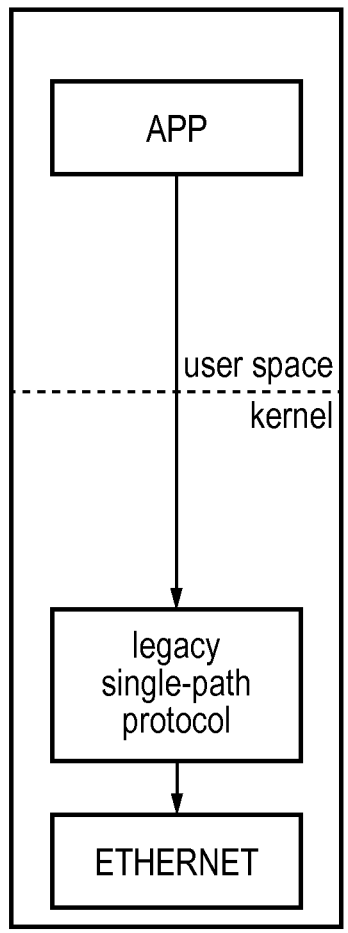
FIG. 3 a legacy single path communication within a user equipment.

Before discussing the embodiments in any more detail, first an overview will be provided.

Embodiments provide multi-connectivity allowing communication of multiple data streams between a user equipment and an intermediate proxy node using multiple paths which may be multiple paths using the same communication techniques, such as multiple Wi-Fi paths or may be multiple communication paths of different types such as a Wi-Fi path, an LTE path and a 5G path. Splitting a data stream into multiple streams and using multiple paths increases the bandwidth available for transport of that data stream and therefore may improve performance. Embodiments seek to do this without requiring modifications to the server/network side and without requiring modification of the network control domain of the user equipment, this latter being protected by root passwords and requiring unlocking of the phone for access. Such unlocking steps are both onerous and can cause voiding of the phone's warranty.

Embodiments address this problem by providing conversion logic within the user domain of the user equipment and providing an intermediate proxy node with corresponding conversion logic, the intermediate proxy node being located between the user equipment and the entity with which it is communicating which may be a server. This conversion logic converts between a single data stream and multiple data streams and provides information which relate the single and multiple data streams to each other in headers compliant with a protocol that both conversion logics can decode. The data streams comprise further headers compliant with transport protocols according to particular standards which allow the network side and network control domain of the user equipment to route the data streams without requiring any modification.

In this way, the conversion logic in addition to splitting the data stream or recombining them will change the header information associated with the data streams such that where a single data stream is formed into multiple streams, an additional header is added relating the multiple streams to the single stream. This additional header is compliant with a protocol which may be a legacy protocol but which can also be a proprietary protocol as it is to be interpreted only by the conversion logic within the user equipment and the intermediate proxy node. The information in this header allows the multiple data streams to be recombined to form a single data stream and may also provide some sort of error correction facility.

Where the conversion logic is recombining the multiple data streams to form a single data stream, then the header according to this protocol is decoded and interpreted such that the multiple data stream can be reformed to form a single data stream. A header is then added to this single data stream which should be compliant with a standardised transport protocol and which in preferred embodiments is the protocol that was originally used with the original single data stream. In this way, when the data stream arrives at its destination it does not look as though it has been altered in any way.

In addition to adding the headers relating the single to the multiple streams, a transport protocol header is added which is a standardised transport protocol and allows the multiple data streams to be routed between the intermediate proxy node and the user equipment. In some embodiments, this transport protocol may be a very simple transport protocol simply indicating where the multiple data streams are to go as any additional functionality such as error correction facilities may be included in the header relating the single to the multiple data streams. In other embodiments, it may be the same transport protocol as is used with the single data stream.

In embodiments multi path connectivity is enabled by taking advantage of the standard user-space framework for virtual private networks that is provided in many user equipment. This virtual private network provides a way of diverting a data stream output towards a particular socket back to the user domain where an application in this case a conversion algorithm can amend the data stream which can then be output towards multiple sockets.

Establishing multi-path connectivity in the user-space mode is advantageous in that it can be done simply by downloading and installing a specialised application which may be created and posted by the network operator. The need for phone unlocking and/or super user access is thus eliminated. Moreover, both standardised and non-standardised protocols for multi-path communications can be implemented using the standard virtual private network framework, even in legacy user equipment.

The concept of multi-path wireless communications is attractive for three reasons:

Performance—the aggregation of multiple independent data delivery links into one logical connection allows a significant increase in the overall throughput as well as reducing latency thanks to the possibility of resource pooling and multiplexing. Unlike standard carrier aggregation, inter-RAT bandwidth aggregation is not limited by the per-RAT spectrum availability.

Quality-of-service control—multi-path communications are a necessary precursor for enabling the control of wireless service quality, a key 5G differentiator, since temporary bandwidth outages can be masked by using adaptive link multiplexing. At the same time, end-to-end latency can be controlled by using redundancy encoding in the form of packet-level forward error correction. The control over the bandwidth-latency trade-off is the basis of efficient quality-of-service provisioning.

Cost efficiency—multi-path communications allow operators to efficiently reuse their existing multi-band multi-technology infrastructure and offer high-speed connections without incurring the significant costs associated with the roll-out of a new high-performance network.

Figure 4:
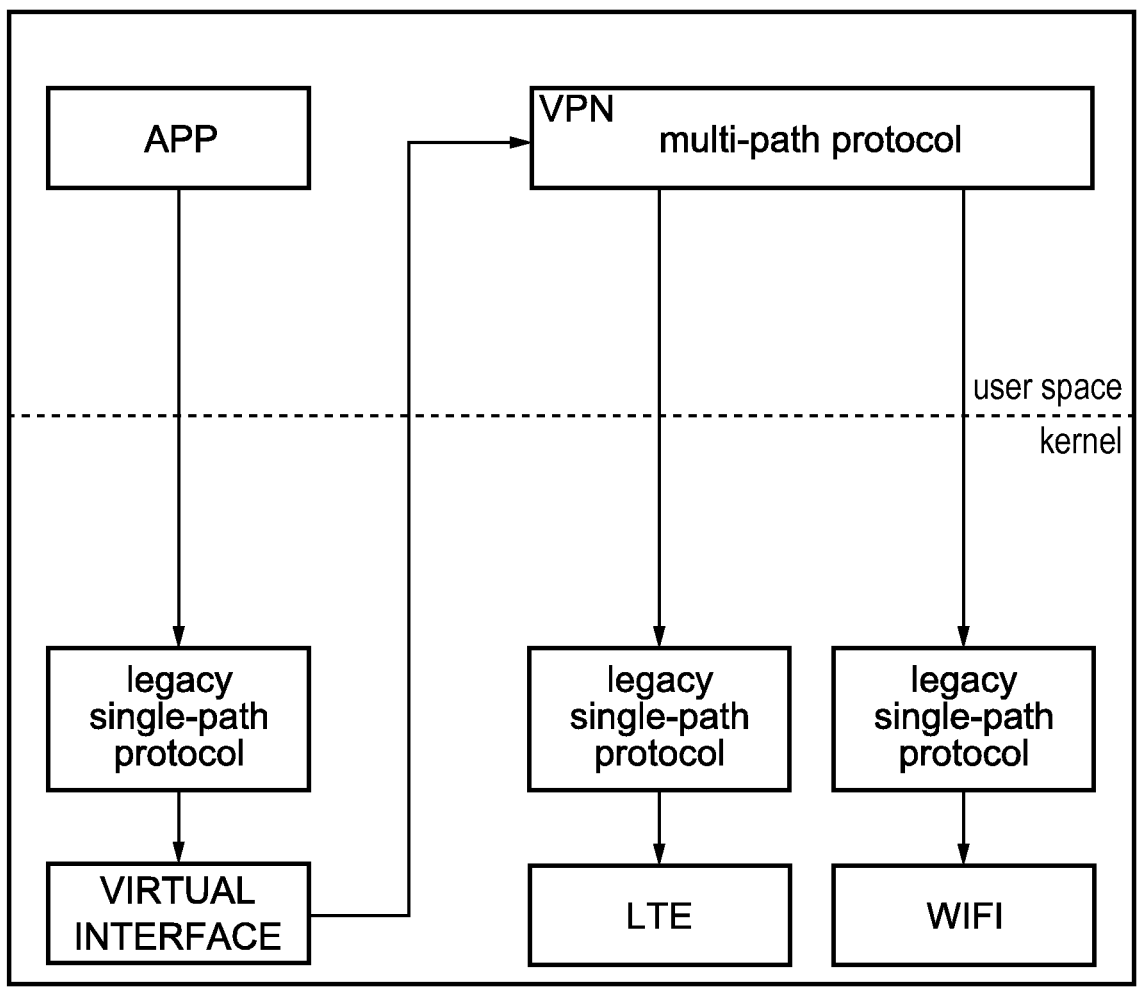
FIG. 4 schematically shows a user equipment according to an embodiment.

FIG. 4 schematically shows a user equipment according to an embodiment. The arrows in this figure show uplink data travelling from an application on the phone towards the network; where downlink data such as video data is received at the user equipment and sent to an application such as a viewing application for that video data, then the arrows would simply be reversed.

In this embodiment, application data generated by an application within the user domain is routed to/from a conversion application providing a multi-path protocol within a virtual private network in the user domain via a virtual interface within the kernel or network control domain of the user equipment. The application generates data and outputs it towards an output socket in a conventional way via the kernel. The data stream has headers compliant with a legacy single path transport protocol. The data stream is intercepted by the virtual interface and diverted to the conversion application within the virtual private network. Thus, during uplink the virtual private network (VPN) service splits the ingress single path data flow of the application into multiple egress sub flows which are then forwarded over multiple physical interfaces, for example LTE and WiFi to the remote content server, via an intermediate proxy node.

During uplink, the conversion logic within the VPN acts by removing the headers compliant with the single path transport protocol dividing the stream in multiple streams and adding headers compliant with a multi path protocol. This protocol may be a proprietary protocol as it needs to be interpreted only by the intermediate proxy node. Additional headers according to a legacy single path transport protocol are then added and are used by the network to route the multiple streams. These headers indicate that the multiple data streams are to be routed via an intermediate proxy node.

Where downlink data is received at the user equipment, this is received as multiple ingress sub flows formed from a single data stream output by the remote server which has travelled via an intermediate proxy node and been divided into the multiple data streams which are received at the different interfaces. Each data stream has headers of a single path transport protocol and additional headers according to the potentially proprietary multi-path protocol and are routed by the kernel to the virtual private network with the conversion logic. Here the multiple data streams are aggregated by the conversion logic into a single data flow with legacy single path protocol compliant headers as is required by the application, this single data flow is then then routed via the virtual interface to the application.

Figure 5:
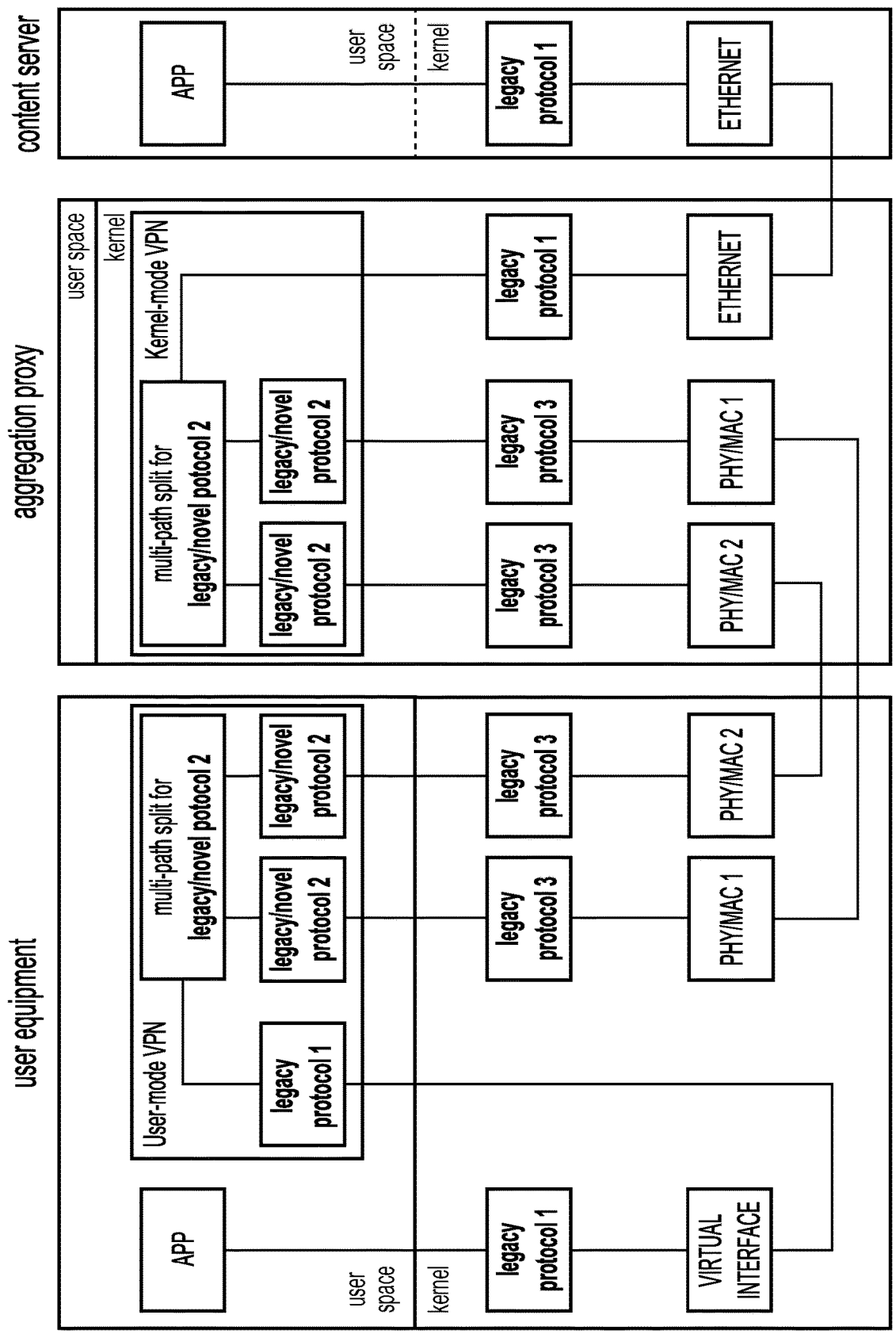
FIG. 5 schematically shows an architecture overview of a user equipment, intermediate proxy node and content server.

FIG. 5 shows an overview of the architecture of the system comprising the user equipment, the intermediate proxy node and the content server. A legacy user equipment can be adapted for operation according to an embodiment where an operator has posted a conversion application and the user downloads and activates it. The conversion application activates the virtual private network feature that is available in many user equipment operating systems and uses this in conjunction with conversion logic to convert between single and multiple data streams.

Thus, as is shown in FIG. 5, the user application APP opens a network socket in order to exchange data with a remote content server using a single path legacy protocol 1, via the non-modified kernel. The output data is routed via a virtual interface which is part of the activated virtual private network and diverted to/from the user-space VPN service.

On the uplink the VPN service will terminate the connection based on the legacy protocol 1 in order to extract the payload data. The data will then be forwarded over multiple physical interfaces denoted by PHY/MAC in FIG. 5 to an operator deployed aggregation or intermediate proxy node using a generic multi-path "protocol 2". "Protocol 2" can consist of either a known legacy protocol such as TCP or it can be a novel/proprietary/enhanced protocol (TCP with optimisation for low latency as described subsequently). Additional headers according to the "legacy protocol 3" of the non-modified kernel serve as the actual transport protocol for the multiple data streams. Thus much of the information regarding the multiple data streams is provided by protocol 2, while the transport/routing of the multiple data streams is controlled in accordance with information in the headers compliant with legacy protocol 3.

The aggregation or intermediate proxy is located between the UE and the remote content server and acts as a connection—split proxy, that is to say it terminates the multi-path connection with the UE based on the protocol 2 information and forwards the aggregated data as a single data stream using the original legacy protocol 1 headers to communicate with the server for example over Ethernet. Since the aggregation proxy is under the control of the network operator or enterprise service provider, the VPN performance may be improved by executing it in the kernel mode as indicated in the example of FIG. 5.

Downlink operation is conducted by the same steps but in the reverse order. Thus, data generated by the content server having headers compliant with legacy protocol 1 is transported over the Ethernet and intercepted by the aggregation proxy where conversion logic within the aggregation proxy will split the single data stream into multiple data streams and provide them with header information compliant with a legacy or novel protocol 2 providing multi-path information and with an additional header compliant with legacy protocol 3 and comprising transport or routing information. The multiple data streams are then routed over different interfaces to the user equipment where conversion logic combines the multiple data streams using the information in the protocol 2 headers.

Figure 6:
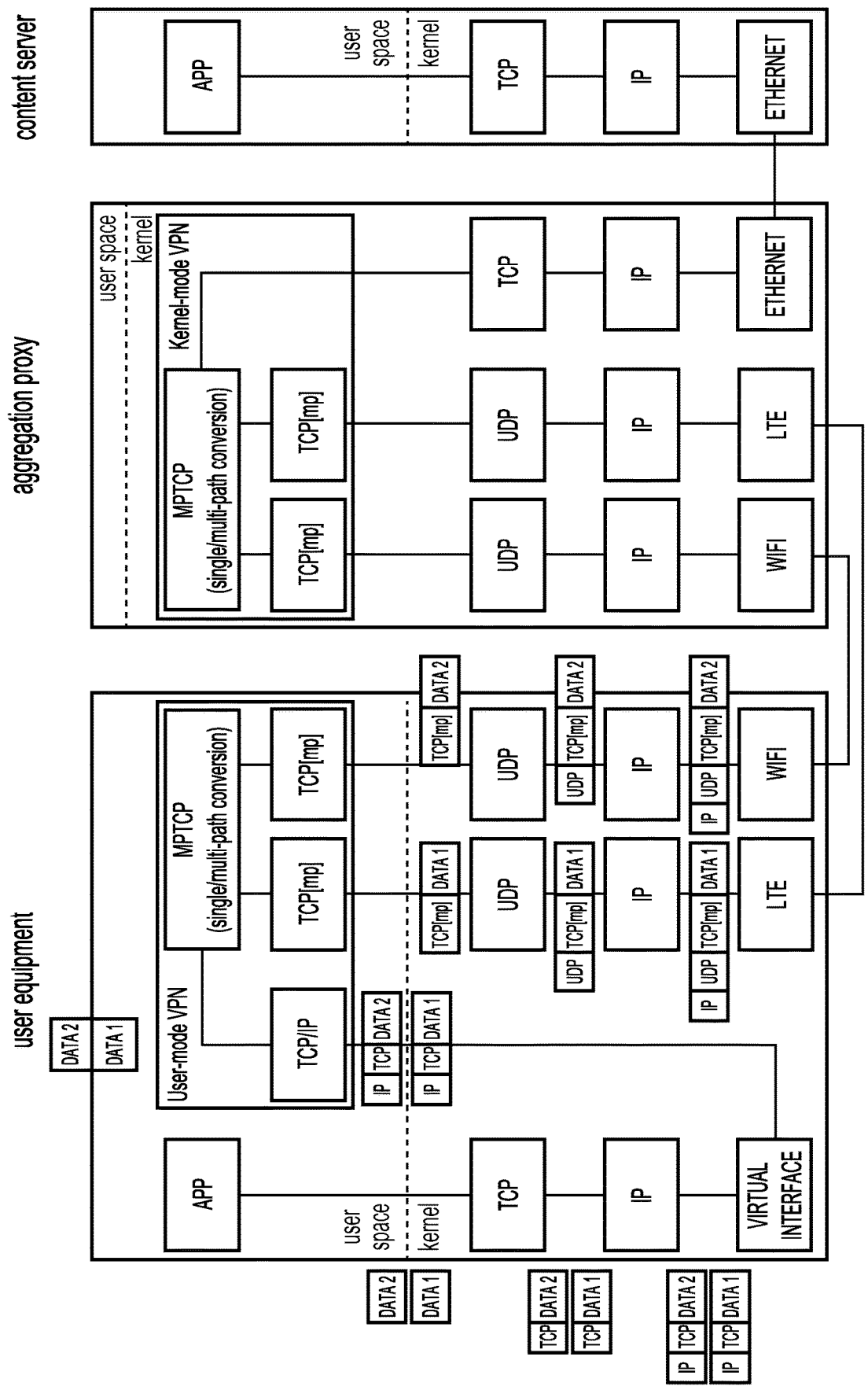
FIG. 6 schematically shows an example of the user equipment and intermediate node according to embodiments using legacy multi-path protocols.

An example of an embodiment using legacy multi-path TCP as protocol 2 is shown in FIG. 6 and detailed below. In this example, the network operator activates the legacy MPTCP functionality for multi-path communications in legacy user equipment.

As shown in FIG. 6, the TCP/IP protocol suite is used to implement the "legacy protocol 1" for the headers associated with the single data stream which is diverted at the virtual interface to the conversion logic within the user mode (VPN). Here the stream is split into multiple data streams and headers according to "protocol 2" which in this embodiment consists of the dual-layer stack for the IETF standardised MTCP are added to the multiple data streams. Thus, in this embodiment a standardised multi-path protocol is used when the single data stream is split to multiple data streams. This is denoted within the figure by using TCP (MP) to indicate their dependence on the MPTCP sub layer, for example in the form of MTCP options for the standardised TCP headers.

In this example, UDP/IP is used as the transport layer, that is the "legacy protocol 3" transport header, however TCP/IP could be used instead. If super-user access is available, protocol-less RAW sockets could be taken advantage of. To ensure privacy and security, the transport over untrusted media such as public WiFi can be enhanced by cryptographic tunnels, for example, IPSec (Internet Protocol Security). The multi-path data streams with these headers are routed to the intermediate proxy node where conversion logic in the kernel mode VPN does the multi-path to single path conversion and they are then transported further across the Ethernet with legacy TCP protocol headers. For download data the paths are reversed.

Figure 7:
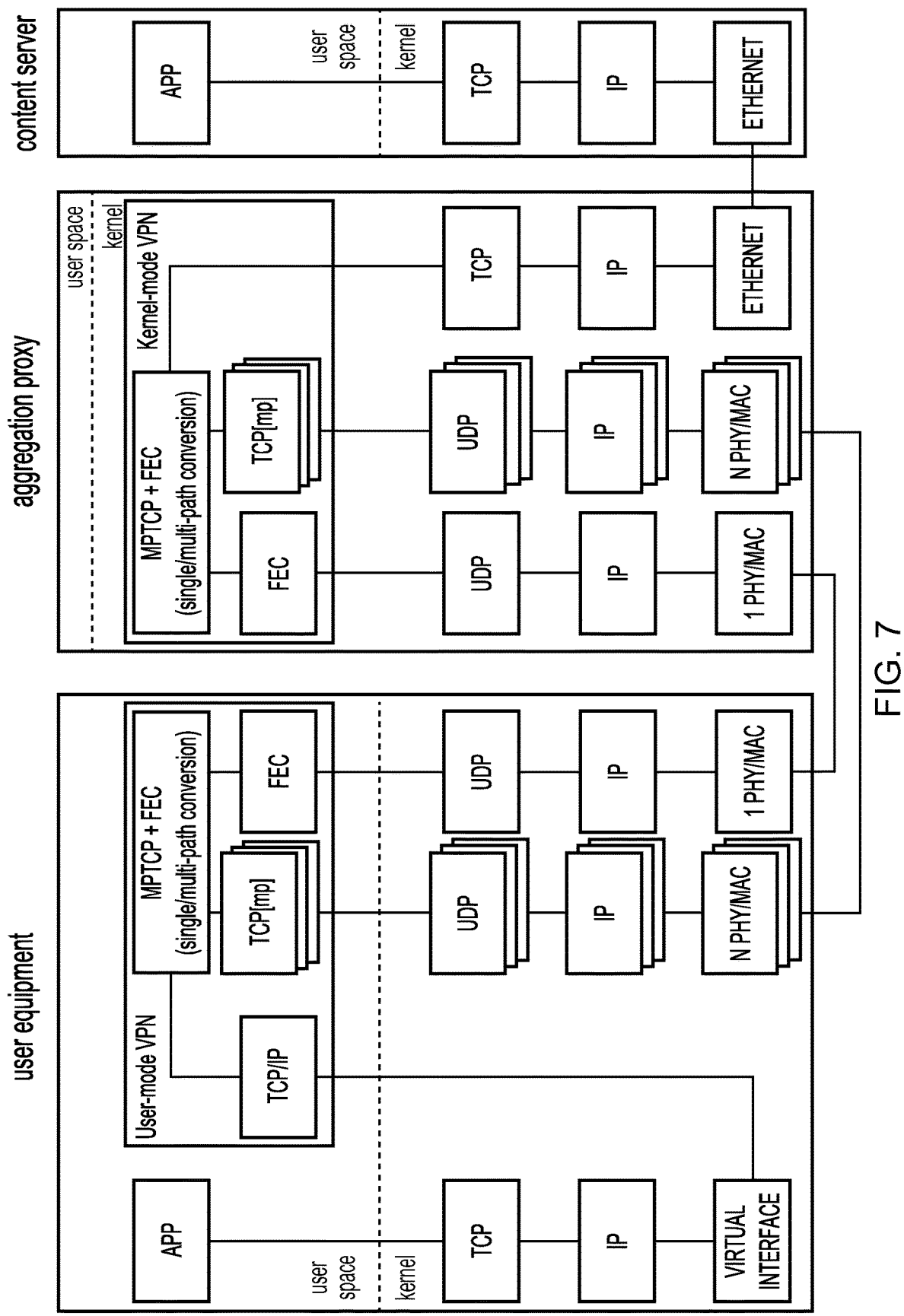
FIG. 7 schematically shows a user equipment and intermediate node using non standardised protocol.

FIG. 7 shows a further example which differs from the example of FIG. 6 by using proprietary multi-path TCP for 5G low latency high bandwidth communications. This allows the MPTCP scheduler to send packet level forward error correction (FEC) information over a parallel UDP connection. It should be noted that although in this embodiment the error correction information is sent on its own parallel path, in other embodiments it may be sent alongside data in different parallel multi-paths.

In this embodiment, every P packets of payload data are accompanied by F packets of forward error correction data generated from the preceding P packets of payload data at the conversion logic. The FEC packets allow for proactive instantaneous recovery for up to F lost packets of payload data without resorting to retransmissions. Control of the P/F ratio provides control of end to end latency and quality of service.

Figure 8:
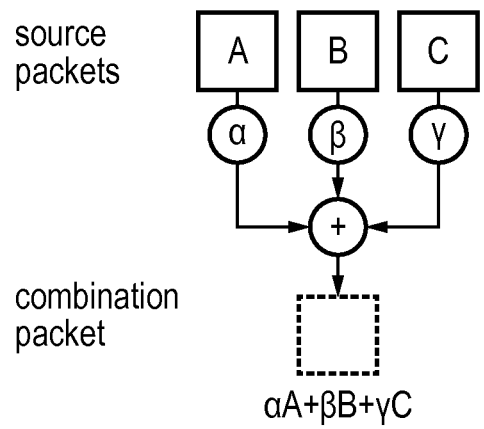
FIGS. 8 and 9 schematically illustrate the generation of error correction codes and the recovering of data therefrom.
Figure 9:
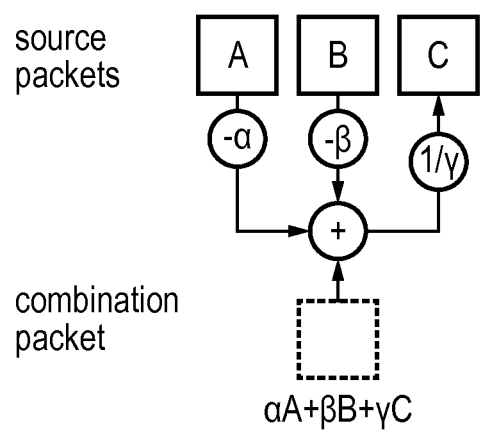

The FEC data can be generated in the form of random linear combinations, combining multiple data packets into so called combination packets as is shown in FIG. 8. The combination packet is generated as a weighted random linear combination of several payload packets by using a binary XOR operation. The multiplicative weights are selected at random in an identical, independent, uniform manner. The recovery of a payload packet can be done in real time by using the received source/combination packets and Gaussian elimination as shown in FIG. 9.

The FEC data is generated at the conversion logic in the user equipment for uplink transmissions and in the conversion logic in the intermediate proxy node for downlink transmissions.

In summary, embodiments provide a way of deploying multi-path communications and QoS control in modern mobile user equipment (UE) such as smart phones and tablets without the need for modifying the UE operating system and thereby covering also legacy user equipment.

The capability of embodiments to aggregate multiple independent data delivery links into one logical connection can significantly increase the overall throughput as well as reduce end-to-end latency thanks to resource pooling and multiplexing. Unlike standard carrier aggregation, the use in embodiments of inter-RAT bandwidth aggregation is not limited by the per-RAT spectrum availability.

Multi-path communications also allow temporary bandwidth outages to be masked out by using adaptive link multiplexing. At the same time, the deploying of arbitrary proprietary protocols to provide the multi-path information can be used to e.g. control the end-to-end latency by using redundancy encoding in the form of packet-level forward error correction. Providing control of the bandwidth-latency trade-off provides a basis for efficient quality-of-service provisioning.

A further advantage of embodiments is that they allow network operators to efficiently reuse their existing multi-band multi-technology infrastructure and offer high-speed connections without incurring the significant costs associated with the roll-out of a new high-performance network.

Embodiments provide multiple innovative features such as:

(i) deployment without the need to modify the UE operating system and covering also legacy user equipment, (ii) freedom to implement both (legacy) standardized and (optimized proprietary) non-standardized protocols for multi-path communications, and (iii) simple and reliable design based on standard operating system tools that are easy to maintain and update.

Performance evaluations indicate that even resource-constrained smartphones such as Nexus 5 exhibited only a small VPN-induced increase of the total CPU-load, in this example from 15% to 21% (i.e., 6% overhead with almost 80% margin) at download speeds of around 200 Mbps, i.e. speeds 10× higher than normally achievable in todays networks.

A person of skill in the art would readily recognize that steps of various above-described methods can be performed by programmed computers. Herein, some embodiments are also intended to cover program storage devices, e.g., digital data storage media, which are machine or computer readable and encode machine-executable or computer-executable programs of instructions, wherein said instructions perform some or all of the steps of said above-described methods. The program storage devices may be, e.g., digital memories, magnetic storage media such as a magnetic disks and magnetic tapes, hard drives, or optically readable digital data storage media. The embodiments are also intended to cover computers programmed to perform said steps of the above-described methods.

The functions of the various elements shown in the Figures, including any functional blocks labelled as "processors" or "logic", may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" or "logic" should not be construed to refer exclusively to hardware capable of executing software, and may implicitly include, without limitation, digital signal processor (DSP) hardware, network processor, application specific integrated circuit (ASIC), field programmable gate array (FPGA), read only memory (ROM) for storing software, random access memory (RAM), and non-volatile storage. Other hardware, conventional and/or custom, may also be included. Similarly, any switches shown in the Figures are conceptual only. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the invention. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

The description and drawings merely illustrate the principles of the invention. It will thus be appreciated that those skilled in the art will be able to devise various arrangements that, although not explicitly described or shown herein, embody the principles of the invention and are included within its spirit and scope. Furthermore, all examples recited herein are principally intended expressly to be only for pedagogical purposes to aid the reader in understanding the principles of the invention and the concepts contributed by the inventor(s) to furthering the art, and are to be construed as being without limitation to such specifically recited examples and conditions. Moreover, all statements herein reciting principles, aspects, and embodiments of the invention, as well as specific examples thereof, are intended to encompass equivalents thereof.

The invention claimed is:

1. A user equipment, comprising:
    at least one processor and at least one memory including computer program code;
    a network control domain with multiple communication paths and multiple physical interfaces, wherein the at least one memory and the computer program code are configured to, with the at least one processor, cause said network control domain to transmit multiple data streams via said multiple communication paths and said multiple physical interfaces in conjunction with data communications between said user equipment and a server; and
    a user domain with conversion logic within said user domain, wherein the at least one memory and the computer program code are configured to, with the at least one processor, cause said conversion logic to convert a single data stream from a user application in said user domain into said multiple data streams, wherein said conversion logic is operable to output said multiple data streams to said network control domain such that at least two of said multiple communication paths are used for transmission of said multiple data streams via at least two of said multiple physical interfaces.

2. The user equipment according to claim 1, wherein said single data stream includes header information compliant with a first transport protocol;
    wherein said conversion logic is operable to add header information compliant with a further transport protocol to said multiple data streams, said added header information containing information for routing said multiple data streams to an intermediate proxy node.

3. The user equipment according to claim 2, wherein said conversion logic is further operable to add header information compliant with a second protocol to said multiple data streams, said added header information providing an indication of how data in said multiple data streams relate to data packets in said single data stream.

4. The user equipment according to claim 2, wherein said conversion logic is operable to remove headers compliant with said first transport protocol, and to add headers compliant with said further transport protocol when converting between said single data stream and said multiple data streams.

5. The user equipment according to claim 1, said user equipment further comprising:
    a virtual interface within said network control domain, said virtual interface being configured to route single data streams between said user application in said user domain and said conversion logic in said user domain.

6. The user equipment according to claim 1, wherein said network control domain is operable to receive second multiple data streams via said multiple physical interfaces in conjunction with said data communications between said user equipment and said server, wherein said network control domain is operable to output said second multiple data streams to said conversion logic;
    wherein said conversion logic is operable to convert said second multiple data streams into a second single data stream, wherein said conversion logic is operable to forward said second signal data stream to said user application in said user domain.

7. The user equipment according to claim 4, wherein said first transport protocol does not include additional header information and thus is a more complex transport protocol than said further transport protocol.

8. The user equipment according to claim 1, wherein at least one of said multiple data streams includes error correction codes for data within said single data stream.

9. The user equipment according to claim 8, wherein said conversion logic is operable to generate said error correction codes associated with said data of said single data stream and to transmit said error correction codes along said at least one of said multiple data streams.

10. A method performed at a user equipment, said method comprising:
providing said user equipment with a user domain having conversion logic;
providing said user equipment with a network control domain having multiple communication paths and multiple physical interfaces;
at said conversion logic, converting a single data stream from a user application in said user domain to form multiple data streams;
outputting said multiple data streams from said conversion logic to said network control domain; and
transmitting said multiple data streams from said network control domain via at least two of said multiple communication paths and at least two of said multiple physical interfaces in conjunction with data communications between said user equipment and a server.

11. A system, comprising:
a user equipment, comprising:
at least one first processor and at least on first memory including first computer program code;
a network control domain; and
a user domain, wherein said user equipment is operable to receive and transmit data via multiple communication paths;
wherein the at least one first memory and the first computer program code are configured to, with the at least one first processor, cause first conversion logic within said user domain to convert between a first single data stream and first multiple data streams formed from said first single data stream, such that at least two of said multiple communication paths are used for transmission of said first multiple data streams formed from said first single data stream; and
an intermediate proxy node operable to receive and forward signals transmitted between said user equipment and a server, said intermediate proxy node comprising:
at least one second processor and at least one second memory including second computer program code;
multiple user equipment interfaces for communicating via said multiple communication paths with said user equipment; and
a server interface for communicating with a server via a single communication path, wherein said intermediate proxy node is operable to receive and forward signals transmitted between said user equipment and said server;
wherein the at least one second memory and the second computer program code are configured to, with the at least one second processor, cause second conversion logic to convert between said first multiple data streams and a second single data stream, such that said second single data stream is sent via said single communication path between said intermediate proxy node and said server, wherein the at least one second memory and the second computer program code are configured to, with the at least one second processor, cause the second conversion logic to convert between said second single data stream and second multiple data streams, such that said second multiple data streams are sent via said multiple data paths between said intermediate proxy node and said user equipment.

12. The system according to claim 11, wherein said second single data stream incudes header information compliant with a first transport protocol;
wherein said second multiple data streams include header information compliant with a further transport protocol;
wherein said second conversion logic is operable to change headers in said data streams when converting between said second single data stream and said second multiple data streams.

13. The system according to claim 12, wherein said first transport protocol does not include additional header information and thus is a more complex transport protocol than said further transport protocol.

14. A method performed at a system, said method comprising:
providing a user equipment with a network control domain and a user domain, said user equipment being operable to receive and transmit data via multiple communication paths;
at said user equipment, converting within said user domain between a first single data stream and first multiple data streams, such that at least two of said multiple communication paths are used for transmission of said first multiple data streams formed from said first single data stream;
providing an intermediate proxy node for receiving and forwarding signals transmitted between said user equipment and a server, said intermediate proxy node including a user equipment interface for communicating via said multiple communication paths with said user equipment and a server interface for communicating with said server via a single communication path;
at said intermediate proxy node, converting between said first multiple data streams and a second single data stream, such that said second single data stream is sent via said single communication path between said intermediate proxy node and said server; and
at said intermediate proxy node, converting between said second single data stream and second multiple data streams, such that said second multiple data streams are sent via said multiple data paths between said intermediate proxy node and said user equipment.

15. A non-transitory computer-readable medium storing program instructions, that when executed by a processor cause a user equipment to perform the method according to claim 10.

16. A non-transitory computer-readable medium storing program instructions, that when executed by at least one processor cause a system to perform a method according to claim 14.

17. The system according to claim 11, wherein said first single data stream includes header information compliant with a first transport protocol;
wherein said first conversion logic is operable to add header information compliant with a further transport protocol to said first multiple data streams, said added header information containing information for routing said first multiple data streams to said intermediate proxy node.

18. The system according to claim 11, said user equipment further comprising:
   a virtual interface within said network control domain, said virtual interface being configured to route said first multiple data streams between a user application in said user domain and said first conversion logic.

19. The system according to claim 18, wherein said first conversion logic is operable in response to receipt of said first multiple data streams from the user application to generate said first single data stream from said first multiple data streams.

20. The system according to claim 11, wherein at least one of said first multiple data streams includes error correction codes for data within said first single data stream.

* * * * *